United States Patent
Lillya

(10) Patent No.: US 11,619,482 B1
(45) Date of Patent: *Apr. 4, 2023

(54) METHOD FOR EVALUATING MACHINED ELECTRODES

(71) Applicant: InnoGraf LLC, Mead, CO (US)

(72) Inventor: Shane Lillya, Wheat Ridge, CO (US)

(73) Assignee: InnoGraf LLC, Mead, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,490

(22) Filed: Sep. 9, 2022

Related U.S. Application Data

(63) Continuation of application No. 17/867,914, filed on Jul. 19, 2022.

(60) Provisional application No. 63/316,481, filed on Mar. 4, 2022.

(51) Int. Cl.
*G01B 11/00* (2006.01)
*G01B 7/008* (2006.01)

(52) U.S. Cl.
CPC ............ *G01B 11/005* (2013.01); *G01B 7/008* (2013.01)

(58) Field of Classification Search
CPC ........ G01B 11/00; G01B 11/005; G01B 7/008
See application file for complete search history.

(56) References Cited

U.S. PATENT DOCUMENTS

| | | | |
|---|---|---|---|
| 3,173,714 A | 3/1965 | Whitwell | |
| 3,517,954 A | 6/1970 | Snyder et al. | |
| 4,219,776 A | * 8/1980 | Arulanandan | G01V 3/06 324/355 |
| 4,290,709 A | 9/1981 | Seldin et al. | |
| 4,315,688 A | 2/1982 | Pryor | |
| 4,349,910 A | 9/1982 | Belz | |
| 4,356,636 A | 11/1982 | Roberts | |
| 4,397,725 A | * 8/1983 | Enzer | G01N 33/49 204/406 |
| 4,788,871 A | * 12/1988 | Nelson | A23L 3/00 73/866.5 |

(Continued)

OTHER PUBLICATIONS

Prieto, F., Redarce, T., Lepage, R. et al. An Automated Inspection System. Int J Adv Manuf Technol 19, 917-925 (2002). Retrieved from the Internet: <URL: https://webdocs.cs.ualberta.ca/~wfb/ammi/publications/J-2002-AMT.pdf>.

(Continued)

*Primary Examiner* — Tung S Lau
(74) *Attorney, Agent, or Firm* — Creativenture Law, LLC; Kevin C. Staed; Dennis JM Donahue, III

(57) ABSTRACT

An improved measurement method and system particularly suited for graphite electrodes which correlates point cloud measurements collected from a CMM probe and laser scanner with an optimized model of the measured electrode to confirm the electrode is within tolerance or identify out of tolerance areas. The innovative method and system include a CMM probe either controlled by the operator or other forms of robotic automation, a laser scanner, and optimized models measured against the measured electrode and a computer server controlling a processing program for sorting and processing the collected measurements and optimized models. The described system and method therefore integrates a blend of technologies to precisely check the electrode for defects and to predict the performance within an electric arc furnace.

20 Claims, 14 Drawing Sheets

(56) References Cited

U.S. PATENT DOCUMENTS

| | | | |
|---|---|---|---|
| 5,521,707 A | 5/1996 | Castore et al. | |
| 6,348,803 B1* | 2/2002 | Mohr | G01N 27/221 |
| | | | 324/642 |
| 6,703,831 B1* | 3/2004 | Keely | G01N 27/904 |
| | | | 324/238 |
| 6,934,039 B2 | 8/2005 | Rincon et al. | |
| 10,697,750 B2* | 6/2020 | Hughey | G01B 5/003 |
| 11,099,052 B2* | 8/2021 | Wildey | G01F 23/284 |
| 2016/0178788 A1* | 6/2016 | Zhang | G01V 3/28 |
| | | | 324/324 |
| 2019/0310125 A1* | 10/2019 | Farmanyan | G01S 13/106 |

OTHER PUBLICATIONS

Graphite Electrode Gauges [online]. FYOU PMEX, Jul. 18, 2022. Retrieved from the Internet: <URL: https://www.fyougauges.com/graphite-electrode-thread-gages/>.

\* cited by examiner

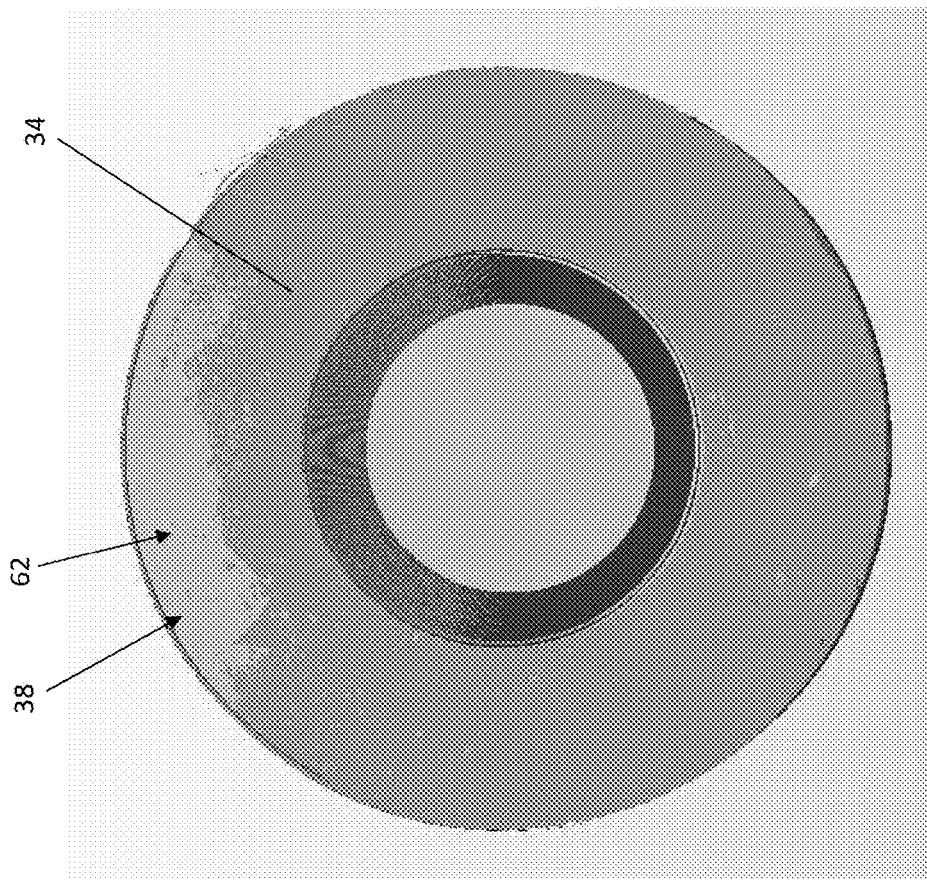
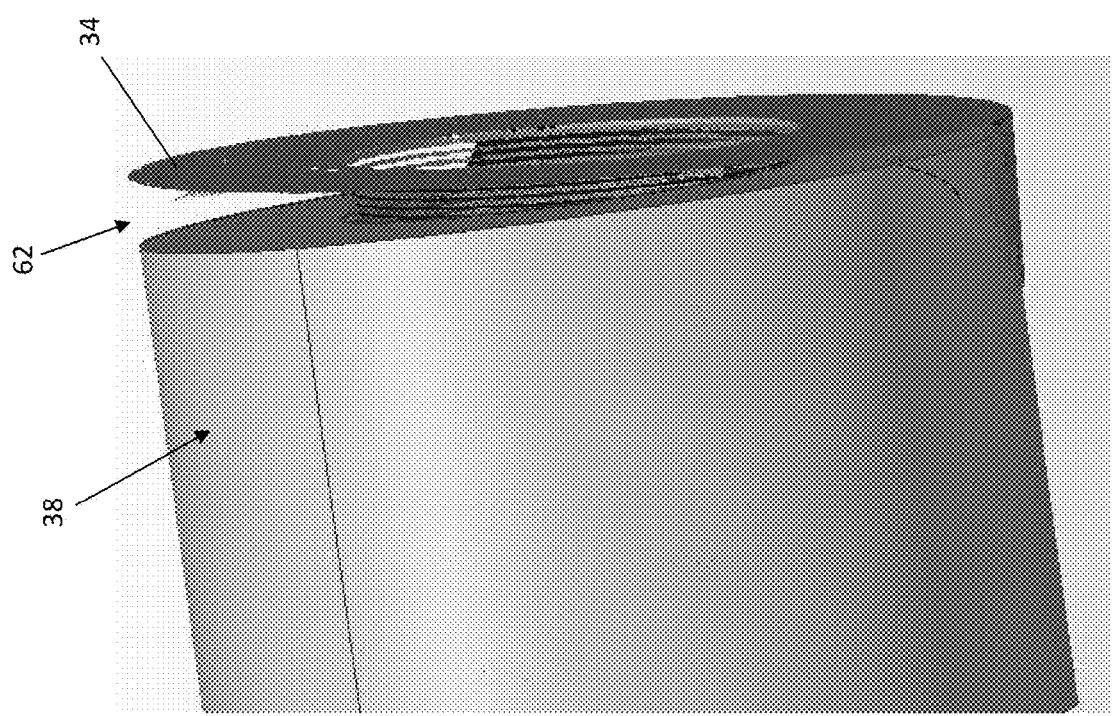
Fig. 8B
Fig. 8A

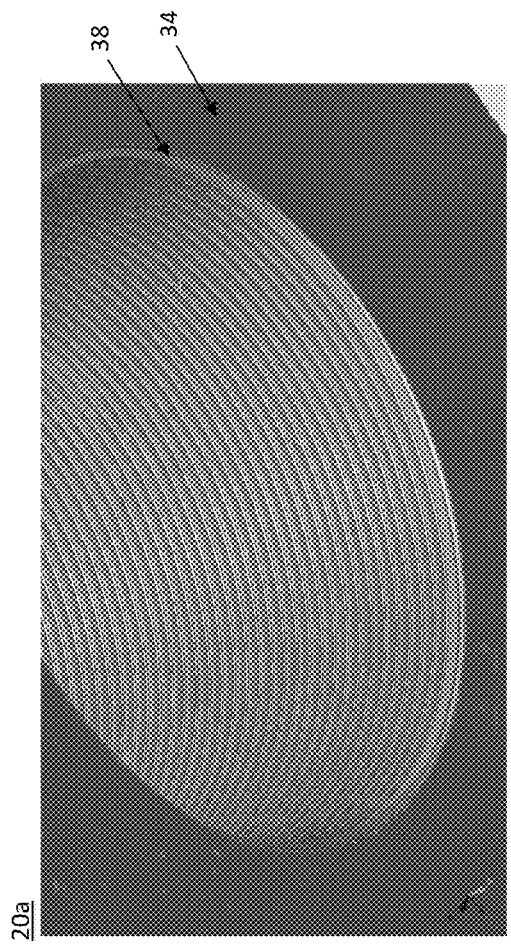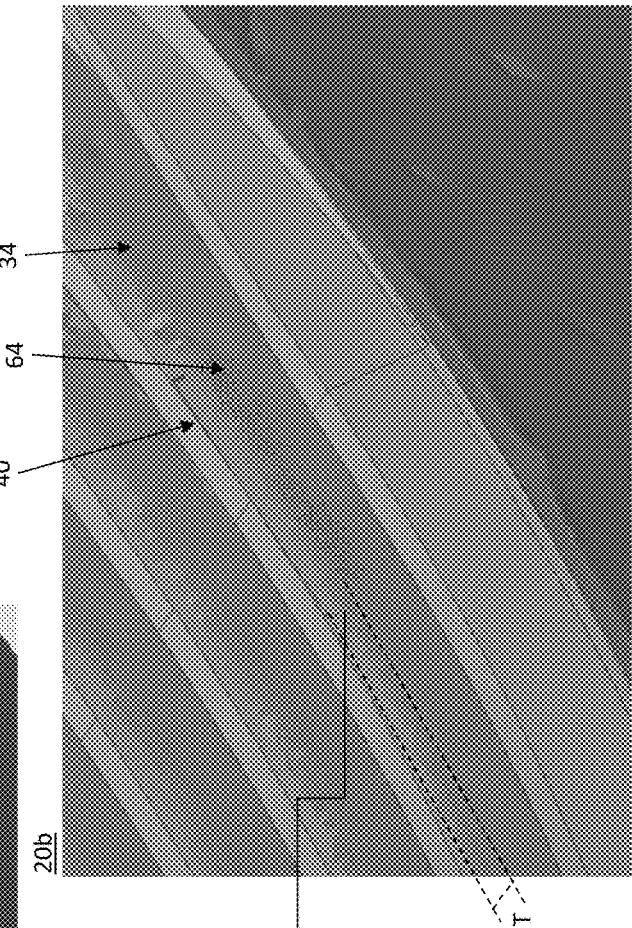

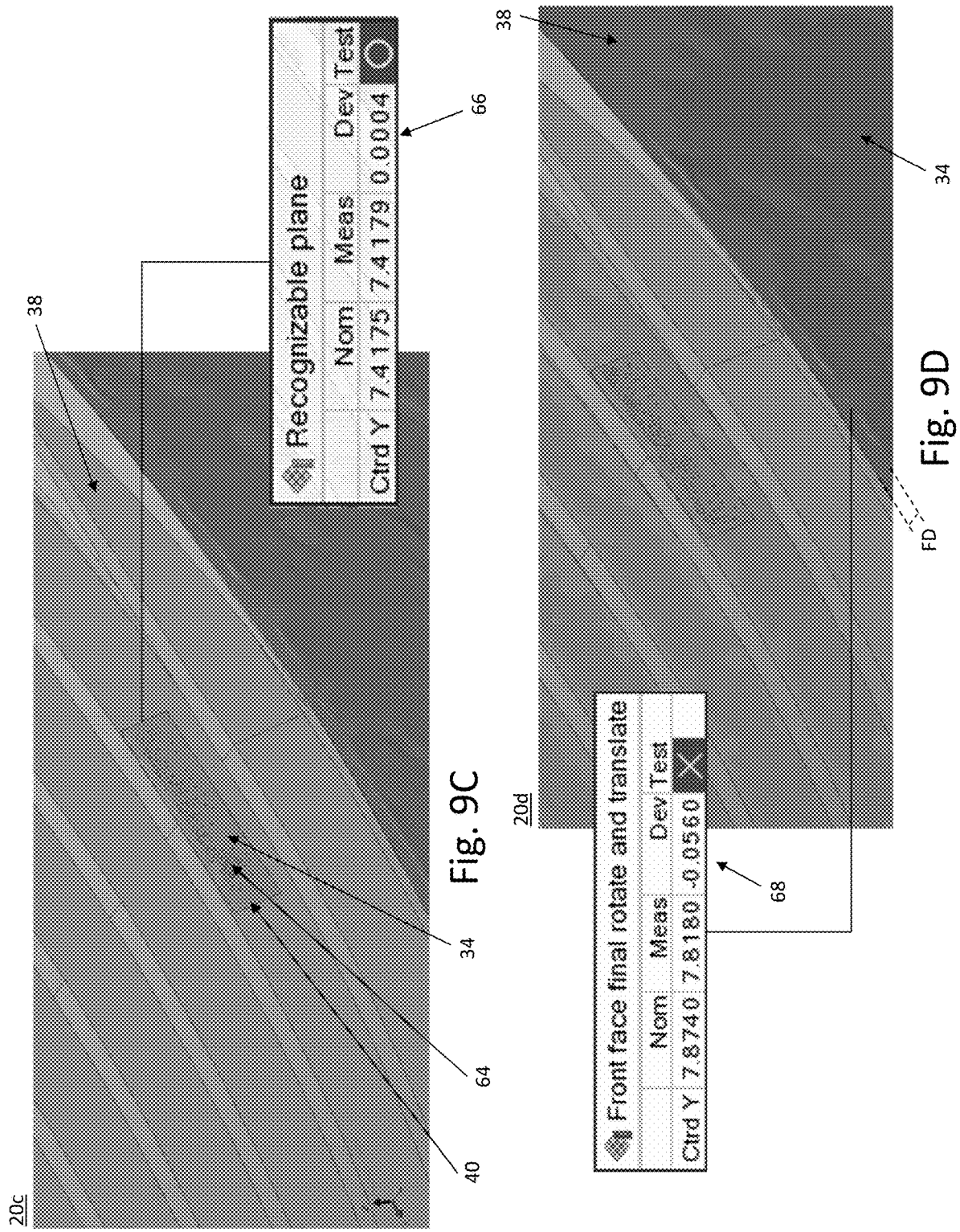

26a

Feature Table

Length Units: Inches
Coordinate Systems: world
Data Alignments: original

105/72

| Name | Control | | Nom | Meas | Tol | Dev | Test | Out Tol |
|---|---|---|---|---|---|---|---|---|
| Outside Diameter | Diameter | | 25.000 | 25.000 | ±0.125 | 0.000 | Pass | |
| Main Socket | | ⌀ 0.025 B | | 0.001 | 0.025 | 0.001 | Pass | |
| | | ⌀ 0.050 B | | 0.000 | 0.050 | 0.000 | Pass | |
| | | ⌀ 0.015 A | | 0.000 | 0.015 | 0.000 | Pass | |
| | Taper Angle 1 | | 12.000 | 12.001 | ±0.025 | 0.001 | Pass | |
| | | 0.025 B | | 0.001 | 0.025 | 0.001 | Pass | |
| Front Plane | | 0.010 | | 0.000 | 0.010 | 0.000 | Pass | |
| Main Diameter | | ⌀ 0.025 B | | 0.000 | 0.025 | 0.000 | Pass | |
| | Diameter | | 13.000 | 13.000 | ±0.025 | 0.000 | Pass | |

Fig. 11

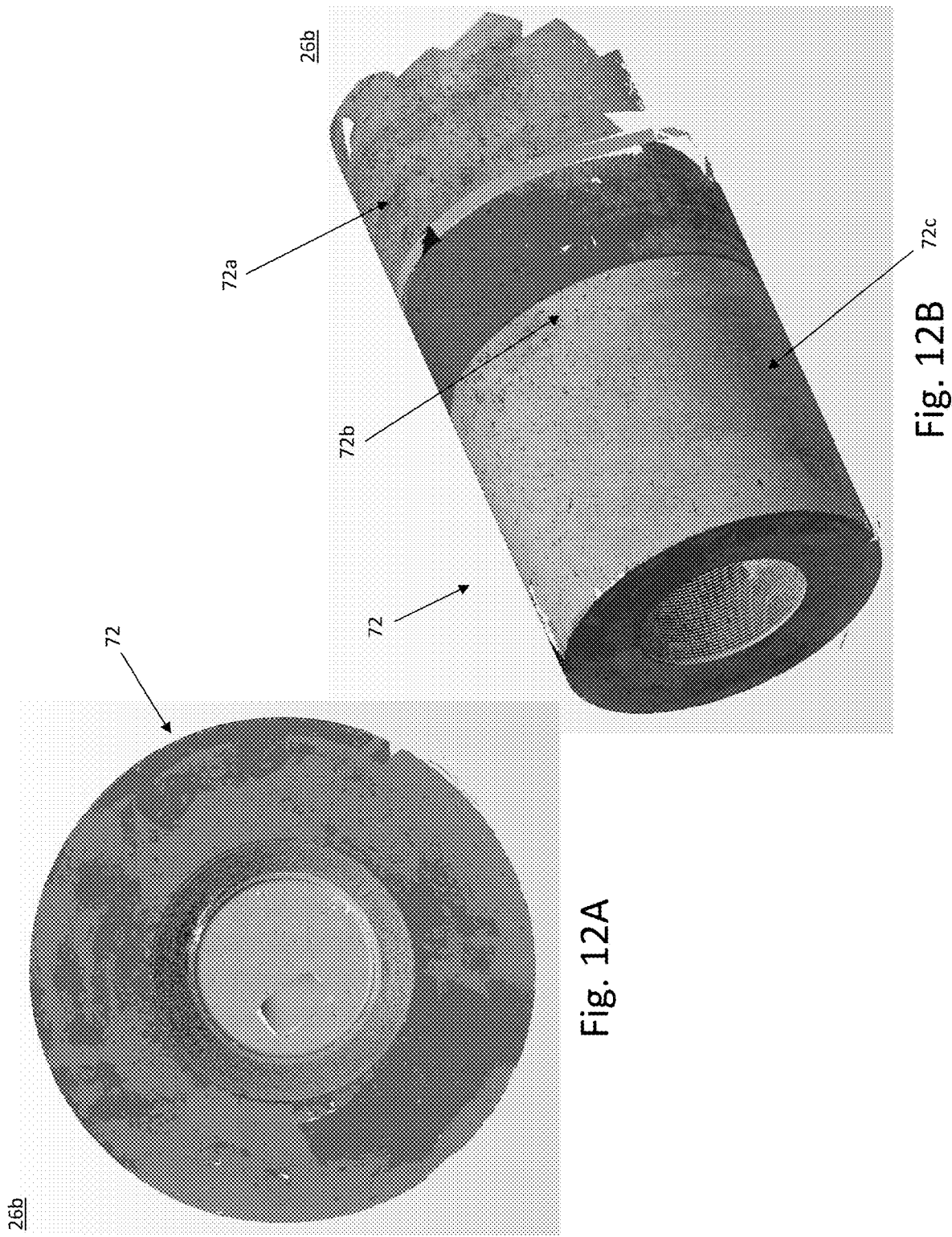

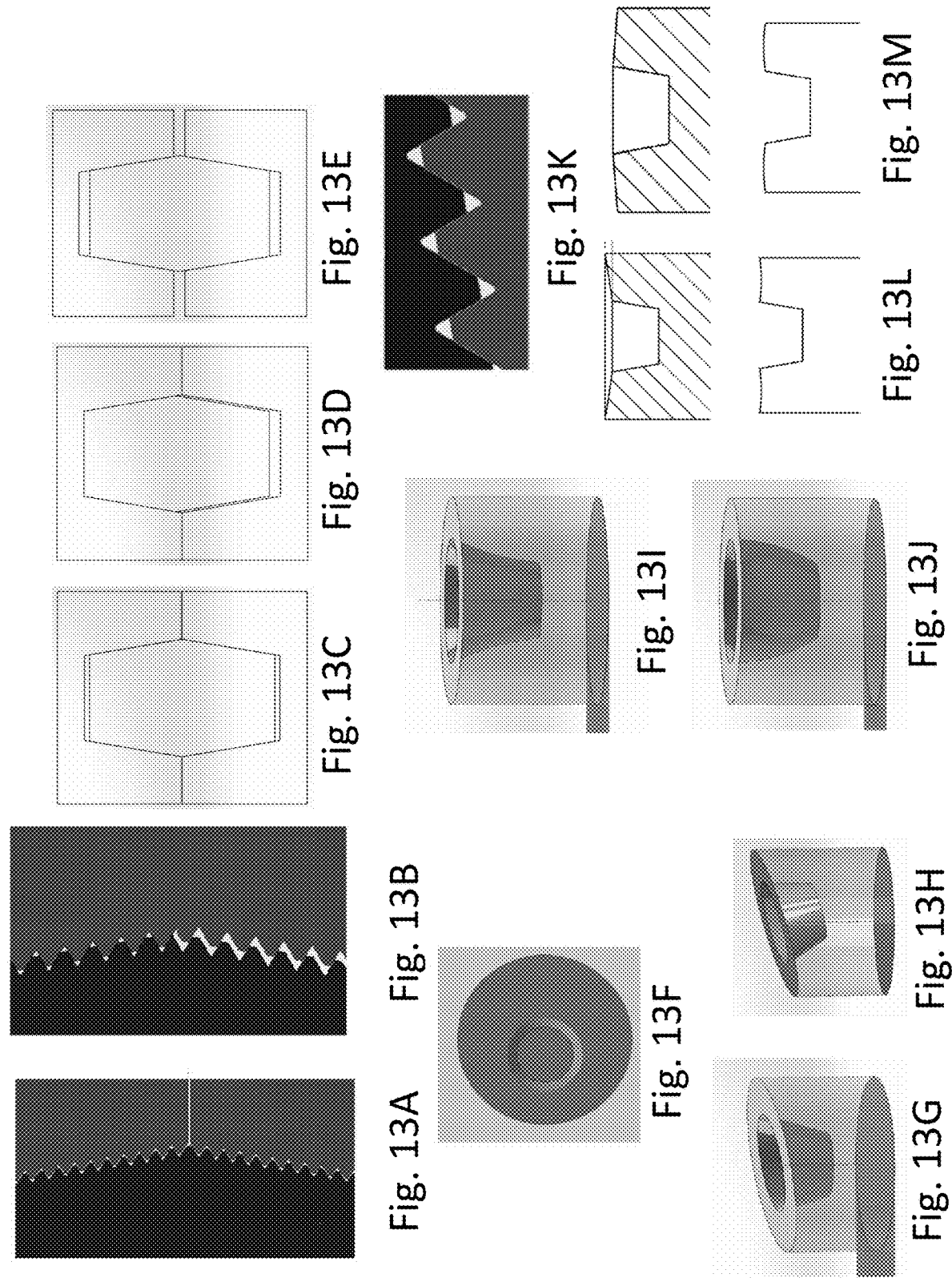

METHOD FOR EVALUATING MACHINED ELECTRODES

CROSS-REFERENCE TO RELATED APPLICATIONS

This application is a continuation of U.S. patent application Ser. No. 17/867,914, filed Jul. 19, 2022, and claims priority from U.S. Provisional Patent Application No. 63/316,481 filed Mar. 4, 2022, and both of which are incorporated by reference herein. U.S. patent application Ser. No. 17/867,914, filed Jul. 19, 2022, also claims priority from U.S. Provisional Patent Application No. 63/316,481 filed Mar. 4, 2022.

STATEMENT REGARDING FEDERALLY SPONSORED RESEARCH

Not Applicable.

APPENDIX

Not Applicable.

BACKGROUND OF THE INVENTION

Field of the Invention

The present invention relates to tolerance control of machined parts, and more particularly to an improved method for measuring machined graphite electrodes and determining whether the machined graphite electrode is within tolerance.

Related Art

Graphite electrodes have long been used as the primary heating element within electric arc furnaces (EAF) and prior to use within the EAF, electrodes are produced, machined and shipped to the end user. As explained in U.S. Pat. No. 4,290,709, electrodes are commonly machined into uniform lengths and subsequently joined together at the point of use. Thus, the production process includes machining a threaded socket in the ends of the electrode which receive a threaded pin to connect electrodes end-to-end. Subsequently, the joined electrodes are consumed as they deliver electric power to the furnace during EAF operation. It takes 5-minutes or less to machine an electrode, and these machining lines are typically run by operators rather than engineers who may not be on site checking for machining tolerance during every shift of the 24-hour manufacturing process. With a 5-minute cycle time, up to twelve (12) parts could be produced every hour that could be out of tolerance and considering it takes three (3) months to manufacture the graphite electrode prior to machining, it can be turned into a guaranteed disaster for the customer within minutes if the machining is out of tolerance.

A meaningful percentage of electrode failures and higher consumption rates are related to defects from the machining process and it is therefore a desire to provide an improved measurement method that allows for quickly and accurately measuring tolerances of each machined electrode on site. More particularly, most electrode performance issues are related to premature stub loss and bottom hot socket failure if the joints open or split. Splitting results from a higher Transverse Coefficient of Thermal Expansion (TCTE) of the pin inside the electrode socket which can be improved with more precise machining and assembly techniques. Accordingly, there is a desire to those in the art to provide an improved machining process with higher quality assurance controls and measuring methods which particularly evaluate the electrode socket and pin.

Problems exist in current machining and quality assurance methodologies which cannot quickly and accurately measure electrode pin and sockets given the difficult geometries. Historically, the industry has relied on two rudimentary methods that allow operators and machinists to measure the electrodes on site, namely ring gauges as shown in FIG. 1A and H-gauges as shown in FIG. 1B.

The ring gauges shown in FIG. 1A are used by screwing two round gauges into a socket or three gauges onto a pin and subsequently measuring the distance between the rings to calculate the taper angle of the material as well as the main diameter of the pin or socket being measured. While quick to use, the ring gauges only measure the socket or pin at two locations and assume the shape is straight between the two ring gauges. False positive measurements can occur when the ring gauges return a taper angle that is correct at the measured points without detecting that the taper angle and profile are not uniform along the entire surface of the pin or socket. Accordingly, the gauges can be fooled into returning false confirmations that the part is in tolerance. Other issues with ring gauges are that they must be temperature controlled to prevent expansion and shrinking and have limited adjustment calibrations. Thus, the measurements are generally limited to taper angle and main diameter, with some ring gauges being adjusted to also measure the tip of the electrode face to the socket. Despite being very quick and easy to use, ring gauges leave a need for an improved measurement technique that checks the tolerance of many electrode elements while also being accurate.

The H-gauges shown in FIG. 1B are a historical relic that are now rarely used to measure machined electrodes. Generally, H-gauges are approximately ¼" thick and were designed to check whether the electrodes were machined on size with pins and sockets being smaller than one side of the gauge and larger than the other side of the gauge such that a pin within tolerance could slide into one side of the gauge but would not fit through the opposite side of the gauge. This crude check relied on many assumptions about the shape of the pin and if the pin was at all misshapen, the operators could be tricked into making incorrect machining adjustment based on the rough check that failed to provide meaningful information on what may have caused the pin to be out of tolerance when measured with the H-gauges.

Other issues exist with the industry measuring standards discussed above including the fact that neither method accounts for the fact that pins and sockets are never full round. Even on a brand-new machining line, the helically tapered pins and sockets will often be out of tolerance by some degree but which is not detected or accounted for by the operator adjusting the machining tools even when an out of tolerance product is detected.

Another methodology that can be incorporated into current measuring systems are coordinate measuring machines (CMM). Although more accurate than ring gauges and H-gauges, measuring with a CMM comes with many of its own problems. The first issue is the porosity of the material wherein a CMM probe can occasionally take a bad measurement point by measuring within a divot on the surface of the graphite. This prevents an automatic CMM from being able to repeatably measure the electrode with just a few points and requires the CMM to take a large number of points before statistically insignificant data points can be identified and ignored, which takes a long time. The material is also malleable, so a touch probe can deform the material ever so slightly as the measurement is being taken and the use of a CMM probe that necessitates taking a large number of measurements inherently increases the likelihood that the measured electrode is damaged during the measurement process.

Another issue with CMMs as currently used is the complexity and expense of operation which requires specialized training to operate correctly. Because the machines are expensive and difficult to use, it is very uncommon for an electrode supplier to have their own CMM on site at each factory. Given the limited use of CMMs, they are only typically used after an issue is assumed to exist. Accordingly, the factory must destructively cut and ship the presumed out of tolerance product to a quality control department for further testing where operators slowly take hundreds of point measurements of the socket and pin with the CMM, after which the results can be sent back to the factory to interpret. If the multiple adjustments to the machining line are needed to correct the machining issue, numerous machined electrodes will be destructively shipped and measured. This makes it very difficult to repeatably, cost effectively, and quickly measure the machined electrodes and subsequently adjust machining parameters to correct defects with a high accuracy. Accordingly, there remains a desire to those havening an ordinary skill in the art to provide an improved measuring technique which can quickly and accurately measure more than the taper angle and main diameter of the pin and socket as currently done with ring gauges but which does not necessitate specialized training and electrode deconstruction before machining adjustments can be made.

The aerospace industry has been adopting laser scanning as a measurement technique which may be well suited for integration into an electrode measuring system and which could accelerate the measuring process. In operation, laser scanners are attached to the probing head of a CMM and can measure millions of data points from the scanned part. The laser scans are computed into a point cloud, which is a simple text file with X, Y, and Z cartesian points for each scanned data point. The software to interpret this point cloud data can easily align the scans to parts that have distinct, recognizable features. However, a problem exists in integrating these known laser scanning methodologies into a machined electrode measurement technique because machined electrodes, and similar machined parts, are devoid of distinct and recognizable features that the processing software requires for alignment of the point cloud data and optimized model.

More particularly, this laser scanning technology has not yet been effectively used for measuring graphite electrodes because they do not have any repeatable features that align directly to the clocking of the threads of the electrode pin and socket. Persons having an ordinary skill in the art will recognize that current processing software struggles with automatically aligning scanned point cloud data with threaded elements. Computer aided design (CAD) models become significantly more complicated when they have more surfaces added to them and a significant number of surfaces are required to draw the tapered helical threads of a graphite electrode and pin. Thus, automatic alignment, such as with the iterative closest point (ICP) algorithm, can take upwards of an hour given the complexity of the point cloud data that make up the model and scans. Similarly, although manual alignment is possible, it is very difficult, sometimes more time consuming, requires a trained operator and allows for human error to impact the measurements. Accordingly, there is a desire for an improved measurement technique to effectively integrate laser scanning methodologies into an electrode measuring system that accounts for the complex geometries when aligning the three-dimensional (3D) scans to the model while reducing overall processing time.

An Automated Inspection System by Prieto, Redarce, Lapage and Boulanger discusses other automated detection systems and how the use of a 3D model of a part can be compared with measured points collected via a range of sensors to verify part tolerances. However, the automated detection systems discussed in An Automated Inspection System uses point cloud datasets for tolerance control that range from a handful of points to a few thousand and also relies on the ICP algorithm to calculate the distance between the scanned points and those on the CAD model. As discussed above, the ICP algorithm and other known alignment methods have long processing times that the invention described herein combats. Further still, tolerance control based on a point cloud having a few thousand points does not provide as precise of a control as is possible with other 3D scans which can quickly take five to ten million points, if not more. Accordingly, there remains a desire to provide an improved measurement methodology which more precisely measures a machined part with a 3D scanner and quickly processes the same without relying on the ICP algorithm.

Other relevant prior art methods and systems are described in U.S. Pat. Nos. 5,521,707 and 6,934,039 which respectively describe how laser measurement systems can be used for analyzing thread parameters that include pitch, lead, root radius, flank angle, surface roughness, helix variation, and pitch diameter and more generally in connection with electrodes as they are used within an EAF. However, there remains a desire to provide an improved methodology which combines the functionality of a CMM, laser scanner and modeling software to quickly, accurately and precisely measure machined electrodes for tolerance.

SUMMARY OF THE INVENTION

The Graph Check system described herein uses measurement data of a machined part that is collected with a CMM probe and laser scanner. The measured data is correlated with an optimized model within a processing program operating on a computer server to determine whether a machined part is within tolerance of optimized dimensions. Using a combination of CMM probing, laser scanning and an optimized model with reference features for assisting with data processing, the improved methodology described herein can process the data very efficiently. Although applicable to various machined parts, the system and method described herein is particularly suited for machined graphite electrodes, which when out of tolerance, can lead to disruptive problems during use mainly due to graphite electrode breakages or premature stub losses in the hot joint in the EAF. By using the probing and laser scanning measurements according to the present invention, the system described herein can dramatically assist both manufacturers and end users in predicting the performance of the electrodes during use on the EAF to significantly prevent these disruptive usage events by catching the machining defects prior to the electrode being used.

In operation, after the operator uses a portable CMM to collect the initial probe measurements used for pre-alignment, a laser scanner collects another set of measurements that can be measured against the optimized model. The large amounts of collected data can be shown both numerically, as well as graphically, which allows for quick interpretations by any individual, including the customer. Accordingly, Graph Check is easy enough to use that not only will it be a tool for graphite electrode producers, but also for graphite electrode consumers.

When an electrode joint is machined incorrectly, the chances of the joint failing on furnace are very high. Thus, customers using Graph Check will be able to detect machining issues before the electrode is used within the furnace. This will directly allow for higher furnace productivity, as well as increased plant safety. In addition, a more precise picture during machining will allow customers to optimize their machining tolerances to allow for "custom fit" for each furnace having its own heat characteristics that may be better suited for electrodes with differing tolerances rather than using uniform tolerances for all electrodes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

FIGS. 8A and 8B show exaggerated examples of the modeled and measured data following the rough alignment step according to the inventive method described herein.

FIGS. 9A-9E illustrate the precise alignment step according to the inventive method described herein.

FIG. 11 shows an example numerical data output according to the inventive method described herein.

FIGS. 12A and 12B depict example visual data outputs according to the inventive method described herein.

FIGS. 13A-13M show exaggerat14ed electrode features that can be evaluated according to the inventive method described herein applied according to the preferred embodiment.

DETAILED DESCRIPTION OF THE PREFERRED EMBODIMENTS

Figure 1B:
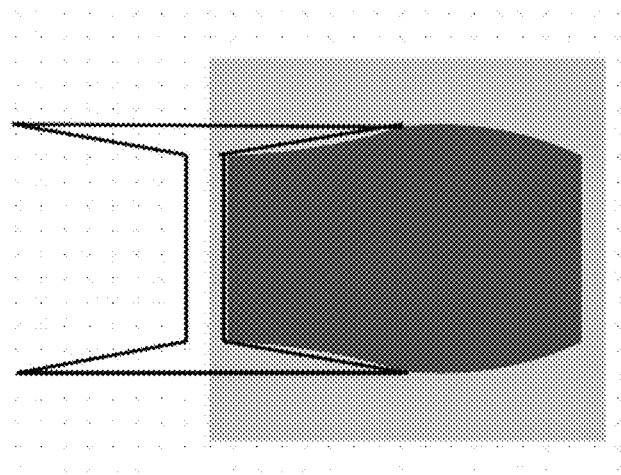
FIGS. 1A and 1B show electrode measurement devices in the prior art.
Figure 1A:
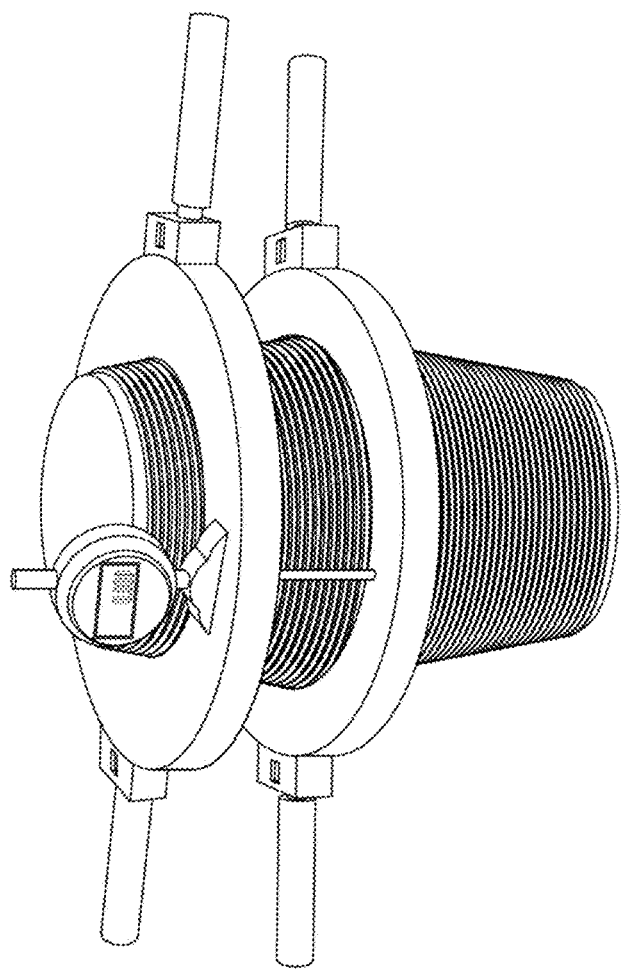

The following description of the preferred embodiment(s) is merely exemplary in nature and is in no way intended to limit the invention, its application, or uses.

Graph Check is an improved measurement method and system which correlates point cloud measurements of a machined part collected from a manually operated coordinate measuring machine (CMM) probe and laser scanner with a 3D model of an optimized part to determine whether the machined part is within tolerance. The innovative method and system described herein is particularly directed to machined graphite electrodes having a socket and pin with a tapered helical thread but is more generally applicable to any machined part which includes a threaded section and at least one unthreaded face. The inventive method includes taking measurements of the machined part via a CMM probe and a 3D laser scanner and correlating the measurements with an optimized model of the machined part having a reference feature for clocking of the threaded sections of the scanned part to the optimized model.

In operation, the measurements of the machined part are taken with the CMM probe and 3D scanner by an operator and are subsequently correlated with the optimized model in a processing program operating on a computer server. The resulting data is subsequently exported in numerical form and as a color map to quickly illustrate defects on the machined part. Accordingly, the Graph Check system uses a blend of multiple technologies to check the machined part for defects which can subsequently be used to correct machining issues and to predict performance of a graphite electrode within an electric arc furnace.

The Graph Check system 10 uses a processing program operating on a computer server to process the collected measurements of the machined part received from the CMM probe and the 3D laser scanner. An optimized model 38 of the machined part 100 is also prepared 74 and received in the processing program along with a reference feature 40 that allows the processing program to clock the threaded sections of the measured machined part with the optimized model without relying on the ICP algorithm as detailed below.

Figure 2A:
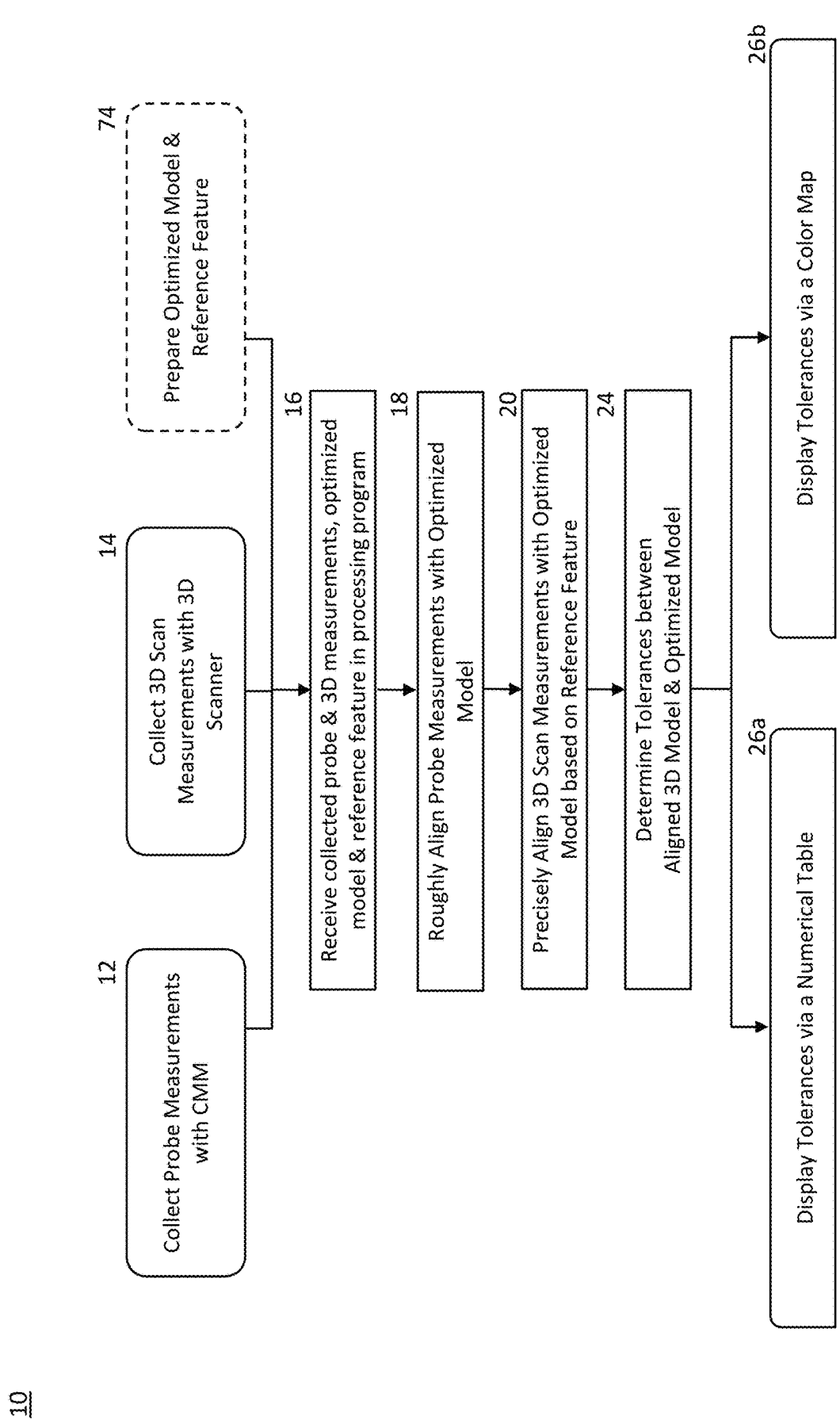
FIGS. 2A and 2B are flowcharts of the inventive method described herein.
Figure 2B:
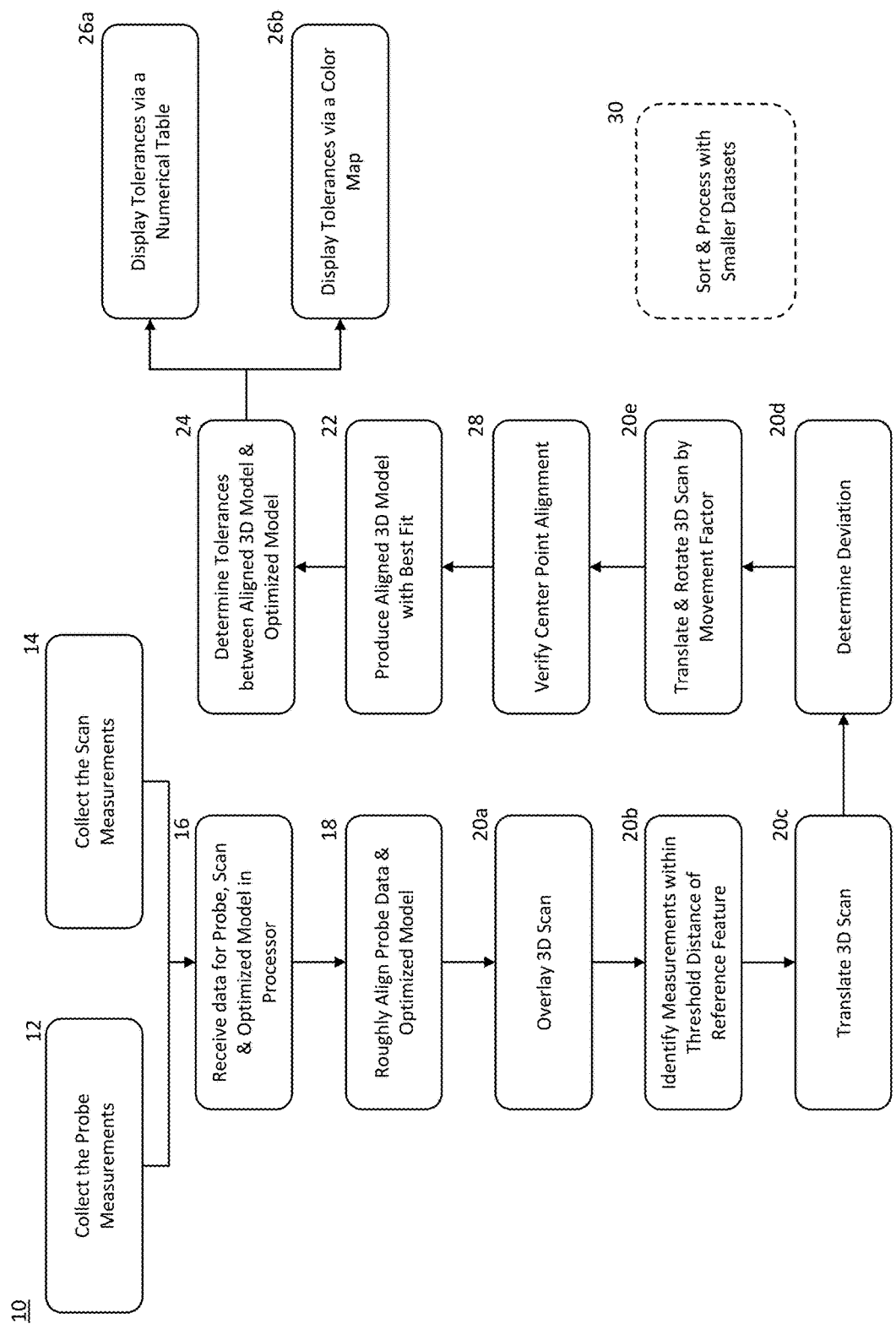
Figure 3B:
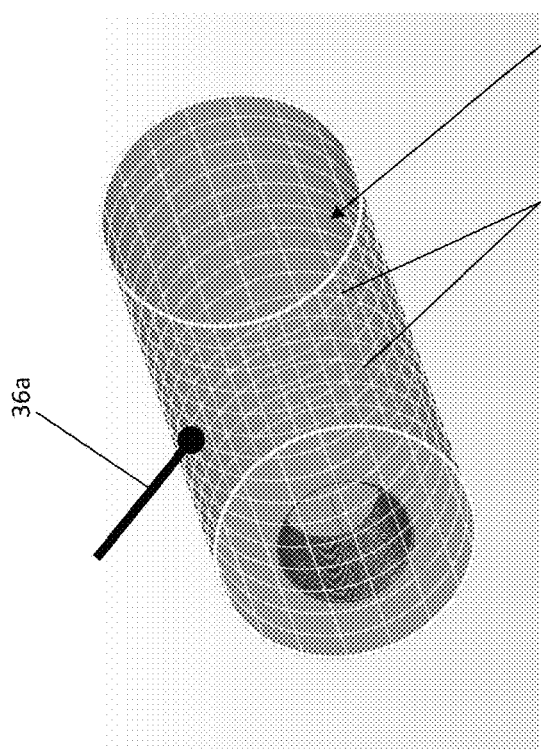
FIGS. 3A and 3B illustrate probe collection of an unthreaded section of a machined part according to the inventive method described herein.
Figure 3A:
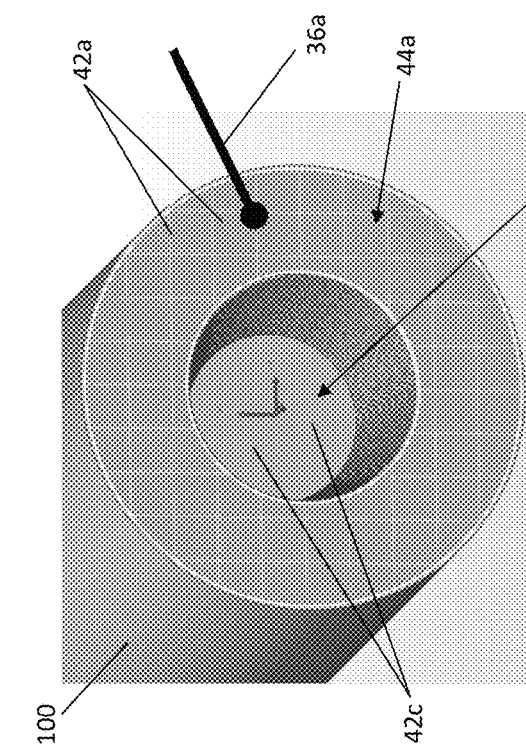

The method described herein and illustrated in the flowchart of FIG. 2A begins with collecting 12 probe measurements 32 of the unthreaded section 100a and threaded sections 100b of the machined part with the CMM probe 36a. These probe measurements enable the processing program to roughly align 18 the measurements of the machined part 100 with the optimized model. With reference to FIGS. 3A and 3B that illustrate collection of the probe measurements on a machined electrode, the operator first probes the unthreaded sections which may include locations 42a on the front face 44a of the electrode, locations 42b on the outside diameter 44b of the electrode and locations 42c on the planar base of the socket 44c. In operation, with other machined parts not particularly shown, such as with the pin that includes a single unthreaded faces connected by the tapered thread, it will be appreciated that the faces need only be probed and this unthreaded probe data can still be used to align the measured electrode with the optimized model without departing from the inventive method described herein even though there is no unthreaded outer diameter.

Figure 4B:
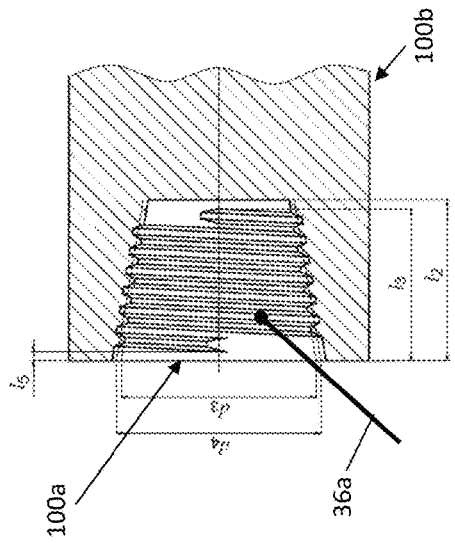
FIGS. 4A and 4B illustrate probe collection of a threaded section of a machined part according to the inventive method described herein.
Figure 4A:
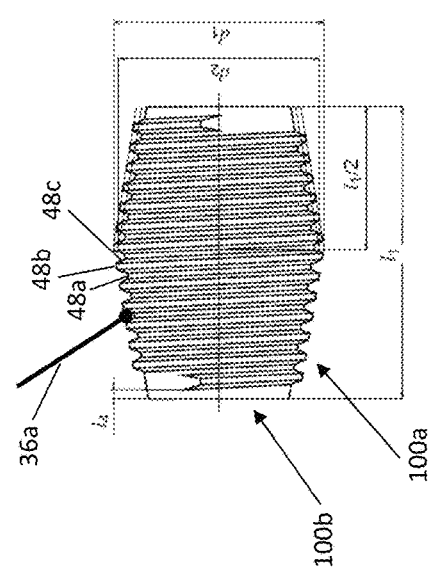

Following the probing of the unthreaded sections of the machined part, such as the face and outer diameter of a machined electrode or opposing faces of a pin, the threaded section of the machined part must also be probed at either the minor or major diameter of the threads and at various locations between adjacent threads. With reference to FIGS. 4A showing a pin and 4B showing a socket, the diameter is collected at either the major diameter ($d_1$) or the minor diameter ($d_2$) for the pin or the minor diameter ($d_3$) or the major diameter ($d_4$) for the socket. When probing the various locations 46 of the thread, the probe sits between the threads with one point taken at a first location on one side of the socket or pin and another point taken approximately 180° on the opposite side. However, because of the helical thread it will be understood that the first and second location would not directly opposite from one another but instead are spaced approximately half the pitch of the thread.

Figure 5A:
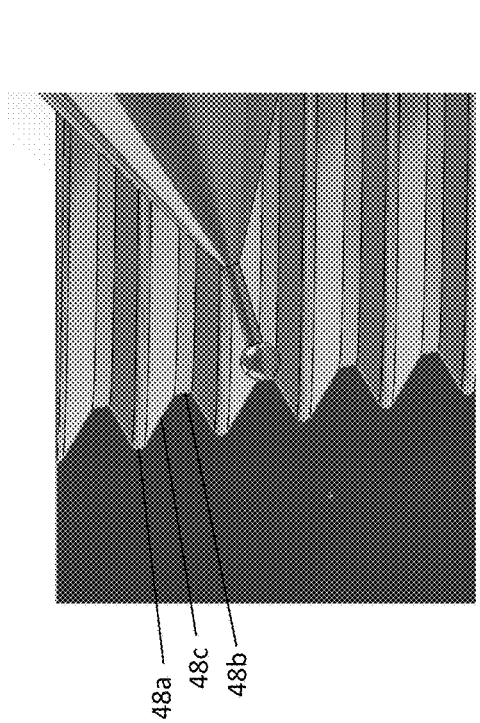
FIGS. 5A-5D are illustrative detail views of the probe collection of a threaded section according to the inventive method described herein.
Figure 5B:
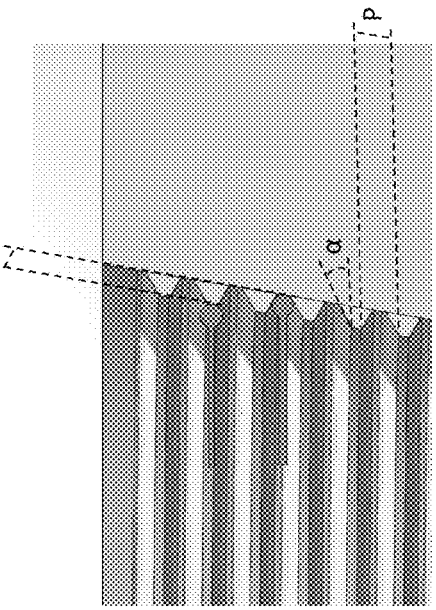
Figure 5C:
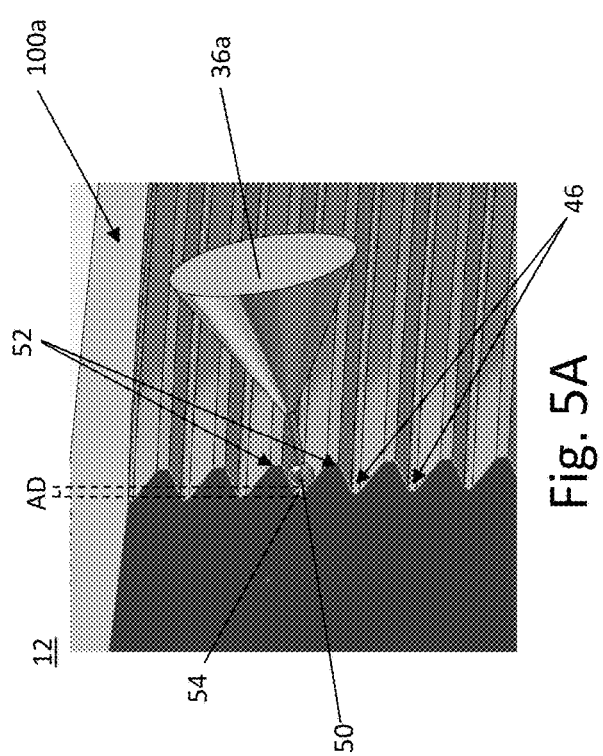
Figure 5D:
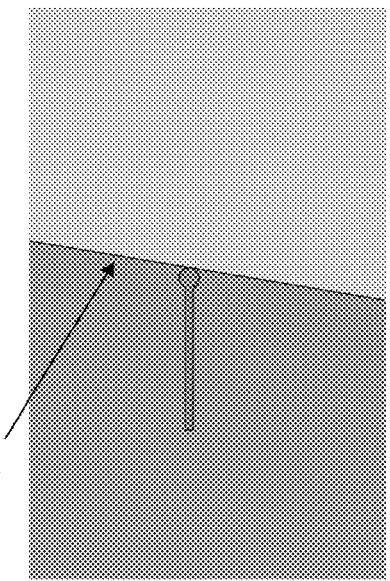

With reference to the detail views of the probe and thread in FIGS. 5A-5C, a problem can arise during the step of probing the threaded section of the machined part. Often times the CMM probe is too large to precisely measure the root 48a of the threads as shown in FIG. 5A and it is very difficult to manually measure the crest 48b of the threads, as illustrated in FIG. 5B, with any sort of repeatability as the probe may tend to slip off the crest of the thread and into the root. Accordingly, it is an aspect of the inventive method described herein in the preferred embodiment to position the probe 50 of the CMM between the flanks 48c of adjacent threads 52 such that a space 54 having a distance (AD) is left between the probe and the root of the thread as shown in FIG. 5A. When repeatedly placing the probe tip between flanks of adjacent threads, the point cloud corresponding to the threaded section returns a simple smoothed cone 56 as shown in FIG. 5C. Accordingly, the offset distance (OD) between the probe locations shown in FIG. 5D will remain constant and can be accounted for when calculating part tolerance according to the additional steps described herein considering the thread pitch, thread angle and taper angle of the threaded section are constant.

Although the number of probe points collected with the CMM is not intended to be limiting and will largely depend on the surface area of the unthreaded and threaded sections of the machined part being measured, it is preferred that the operator measure each unthreaded section at approximately three to ten (3-10) points and measure each threaded section at approximately fifty to one hundred (50-100) points throughout the length of the thread. For example, when a machined electrode having a socket and pin is measured according to the inventive method described herein, the operator first probes the front plane of the electrode with approximately three to ten (3-10) points, then probes the outside diameter of the electrode with approximately six to ten (6-10) points and finally probes fifty to one hundred (50-100) points at locations throughout the socket and/or pin to get a full image of the machined electrode.

Figure 6:
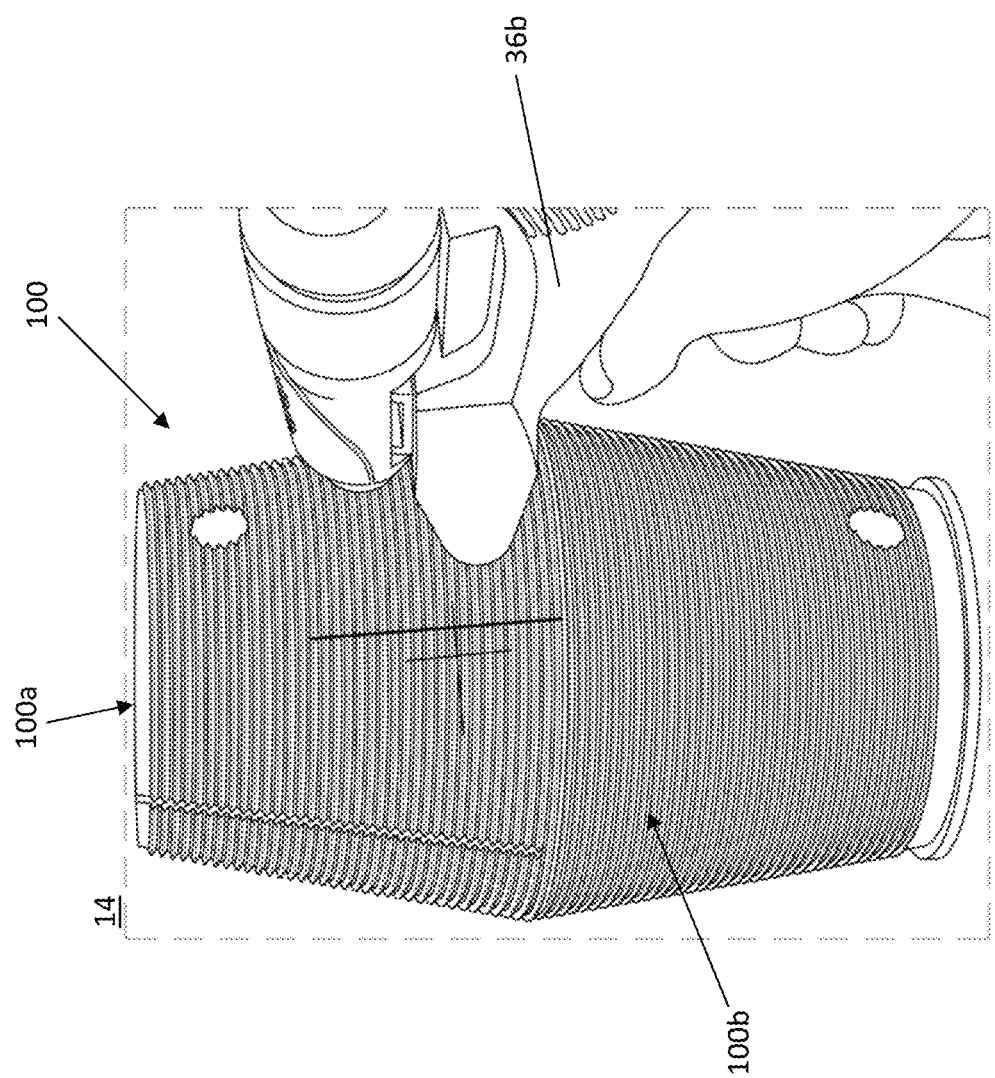
FIG. 6 depicts a 3D scanner used according to the inventive method described herein.

Following collection of the probe data with the CMM, the operator uses a 3D laser scanner 36b to collect 14 a set of scanned measurements 34 of the machined part, including both the unthreaded and threaded sections, for creating a full 3D scan. FIG. 6 shows an example laser scanner and pin. With the laser scanner, the system can measure much more than just the dimensions of the electrodes features with the 3D measurements saved as a point cloud that is preferably between five to ten million (5,000,000-10,000,000) data points but is at least five orders of magnitude larger than the point cloud which makes up the set of probe measurements discussed above. For example, the laser scanning and resulting 3D scan of the machined part allows the processing program to measure form, profile, location, runout and orientation of each feature in relation to the other features. This additional data allows the processing program to detect more precise tolerances between the scanned part and optimized model which subsequently provides a better idea of how the machining is going to affect the performance of the part as particularly detailed in the sections below for a machined electrode. Rather than just using a laser scan to measure the part, the system uses the CMM probe for simple measurements that can be collected by an operator to roughly align the part prior to completing the alignment with greater precision based on the laser scan. However, laser scanning allows for the gathering of data without user interference and to collect large amounts of data over a large space, where singular datums are problematic.

The resulting probe and 3D scan data is subsequently received 16 in the processing program of the computer server along with the optimized model and reference feature before it is processed according to the additional inventive steps described herein. It will be appreciated that various steps of the inventive method can be carried out in alternative orders than what is described and the scope of the inventive method should not be limited in any specific order. For example, it is not necessary to provide the probe data and 3D scan at the same time wherein processing can begin in the processing program without having a complete 3D scan. Similarly, the optimized model may be uploaded to the processing program long before or after the measured data.

Figure 7B:
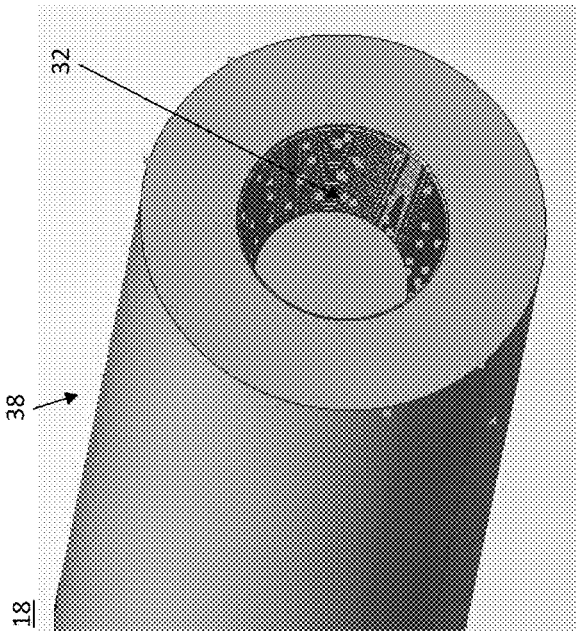
FIGS. 7A-7C illustrate the rough alignment step according to the inventive method described herein.
Figure 7A:
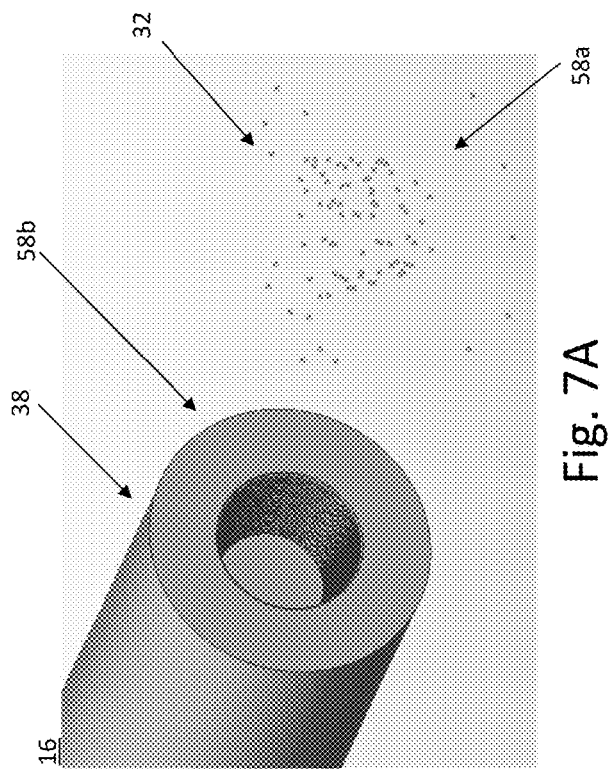

Once the data is received in the processing program, the optimized model is initial aligned with the probe data. As depicted in FIG. 7A, prior to the initial rough alignment, the point cloud data from the probe measurements is positioned by the processing program at a location 58a that may be entirely offset from the location 58b of the optimized model. Accordingly, after the probe measurements are collected, the processing program roughly aligns the probed points with the optimized model such that the measured data and optimized model are at least approximately within an acceptable variance in the same Cartesian Plane as illustrated in FIG. 7B. Although the acceptable variance is not intended to be limiting, the probe data pre-aligns the measured data to the 3D model so the scanned data is within one sixteenth of an inch (1/16"). Once roughly aligned, precise alignment of both the unthreaded and threaded sections of the measured part and optimized model can be completed.

Figure 7C:
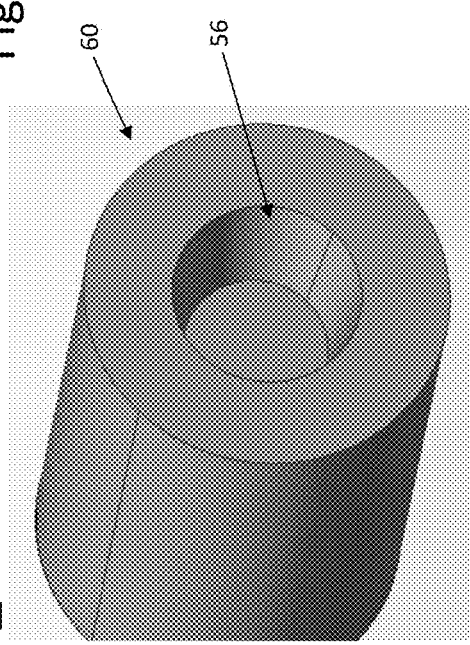

Although it will be appreciated that rough alignment could be accomplished with both probe data from the 3D scan without first probing the threaded and unthreaded sections of the machined part with the CMM all together, the preferred method described herein uses the CMM probe measurements because it produces significantly less data points than the probe data of the threaded section and the laser scanner. In addition, based on the measurement technique of the threaded section explained above, the processing program considers the threaded section to only be a smooth conical surface and there is therefore no need for a complicated large CAD file to be a part of the rough alignment. Accordingly, a simplified model 60 as shown in FIG. 7C which includes significantly fewer surfaces as compared to the threaded model shown in FIG. 7B can be used during rough alignment to reduce the file size of the CAD model and thereby reduces processing time for aligning the electrode with the model.

Tapered helical threads in a CAD model create a significant number of surfaces in the model. The same file with a smoothed socket vs a threaded socket can reduce the file size by one or more orders of magnitude. This difference in file size makes it substantially easier to calculate the information from the data points. Thus, it is not uncommon to remove threads from a model to reduce the CPU draw of the model. For example, in other operations threads are often times left off CAD models and instead are either cosmetically printed onto a corresponding hole or the hole is drawn as a smooth cylinder and the threads are called out on the engineering drawing instead. Thus, initial pre-alignment processing is carried out by the processing program more quickly with the considered data corresponding to a smooth surface rather than threads which are clocked during precise alignment.

Although the initial rough alignment of the optimized model and the probe data arranges the data in close proximity and a perfectly calibrated CMM and laser scanner could result in perfect alignment of the measured data and optimized model, inherent imperfection within equipment having standard calibration results in the 3D scan and probe data being slightly off from the optimized model and precise alignments must therefore be made before machining defects can be analyzed. For example, FIGS. 8A and 8B illustrate exaggerated deviations 62 in the X, Y and Z planes between the 3D scan and the optimized model when overlayed together according to the inventive precise alignment process discussed below with regard to FIGS. 9A-9D. Furthermore, the probe data and pre-alignment has not yet clocked the threads. Although the 3D scan and optimized model are therefore not yet aligned, correlating the data within the corresponding point clouds can be used to quantify the deviation for translation and rotation of the 3D scan to precisely align it with the optimized model and to produce an aligned 3D model of the machined part. Thus, the next step in the inventive method described herein is the precise alignment 20 of the 3D scan with the optimized model with the threads of the tapered helix being clocked.

With the probe data having aligned the measured data to the 3D model within the acceptable variance as discussed above, the processing program correlates the 3D scan with the optimized model having the reference feature to determine the deviation therebetween. With particular regard to the socket of a machined electrode, the first step in the precise alignment is overlaying 20a the smooth cone formed by the crest of the threads from the 3D scan data with the smooth socket of the optimized model. As explained above, threads are not readily recognized by processing programs but the data corresponding with the crest of each thread can be interpreted as a smooth cone and aligned with the socket of the optimized model in two of the three Cartesian planes, for example the Z and X planes according to the example discussed herein and illustrated in FIG. 9A. Furthermore, the process is the same for a machined pin, or other similar part, and a person having an ordinary skill in the art will appreciate application of the inventive precise alignment method as described with regard to the socket of a machined electrode is not limited thereto.

Figure 10:
FIG. 10 shows a detail view of the reference feature according to the inventive method described herein.

Although the 3D scan is aligned with the optimized model in the Z and X planes, the scan and model are offset in the Y plane and the scan therefore needs to be translated 20c in the Y direction before the threads can be accurately clocked. As noted herein, data corresponding to the threads in both the scan and model are not readily recognizable by existing software to the inventive system described herein embeds a reference feature within the threads of the optimized model that can be detected and used 20b to determine the amount the 3D scan needs to be translated before the threads are clocked. Preferably, this reference feature is a two-dimensional dataset that approximates the cross-section of at least one of the thread flanks such that the two-dimensional dataset has a reference pitch (P') and a reference angle (β) corresponding with the thread pitch (P) and the thread angle (α) as shown in FIG. 10.

To determine the amount the 3D scan needs to be translated before the threads are clocked, the processing program searches for a group of proximate data 64 within the 3D scan which is normal to the reference feature and within a threshold distance (T) as shown in FIG. 9B. Although not intended to be limiting, the preferred threshold distance is equal is one-quarter (¼) of the thread pitch which equates to one sixteenth of an inch (1/16") in the example discussed herein. If no proximate data is identified within the threshold distance of the reference feature, the processing program rotates the 3D scan at ninety-degree (90°) increments around the Y-axis until proximate data is found and the deviation between the scanned data and optimized model can be determined. Thus, the processing program should find proximate data within one thread revolution. For example, the processing program highlights proximate data in FIG. 9B and shows the deviation 66 between the 3D scan and the reference feature is fifty-three thousandths of an inch (0.053"). With the deviation between the threads now known, the 3D scan can be translated along the Y axis by the same degree with the scanned threads aligning with the threads in the optimized model to bring the deviation to approximately zero (0) as shown in FIG. 9C.

Although the threads are now aligned, because the reference feature is embedded within the thread of the optimized model and has a reference angle and pitch that matches the thread as discussed above, translation of the 3D scan in the Y axis moves the face of the machined electrode out of alignment with the face of the optimized model as illustrated in FIG. 9D. Accordingly, the processing program conducts a final measurement to determine 20d the face differential (FD) which has a deviation 68 between the face of the 3D scan and the face of the optimized model to make the final translation and rotation so that that best fit between the 3D scan and optimized model can be determined and an aligned 3D model of the machined part can be evaluated. Accordingly, the 3D scan must be finally translated and rotated 20e by a movement factor based on a translation parameter (F) and a rotation parameter (D). In operation, the 3D scan is translated back in the Y direction by the translation parameter which is equal to the face differential while also being rotated counter-clockwise around the Y-axis by the rotation parameter (D) which is equal to the face differential (F) divided by the pitch (P) times 360-degrees. Relevant formulas also duplicated below:

$$F = \text{Measured Face Differential}$$

$$D = \frac{F}{P} \times 360$$

Figure 9E:
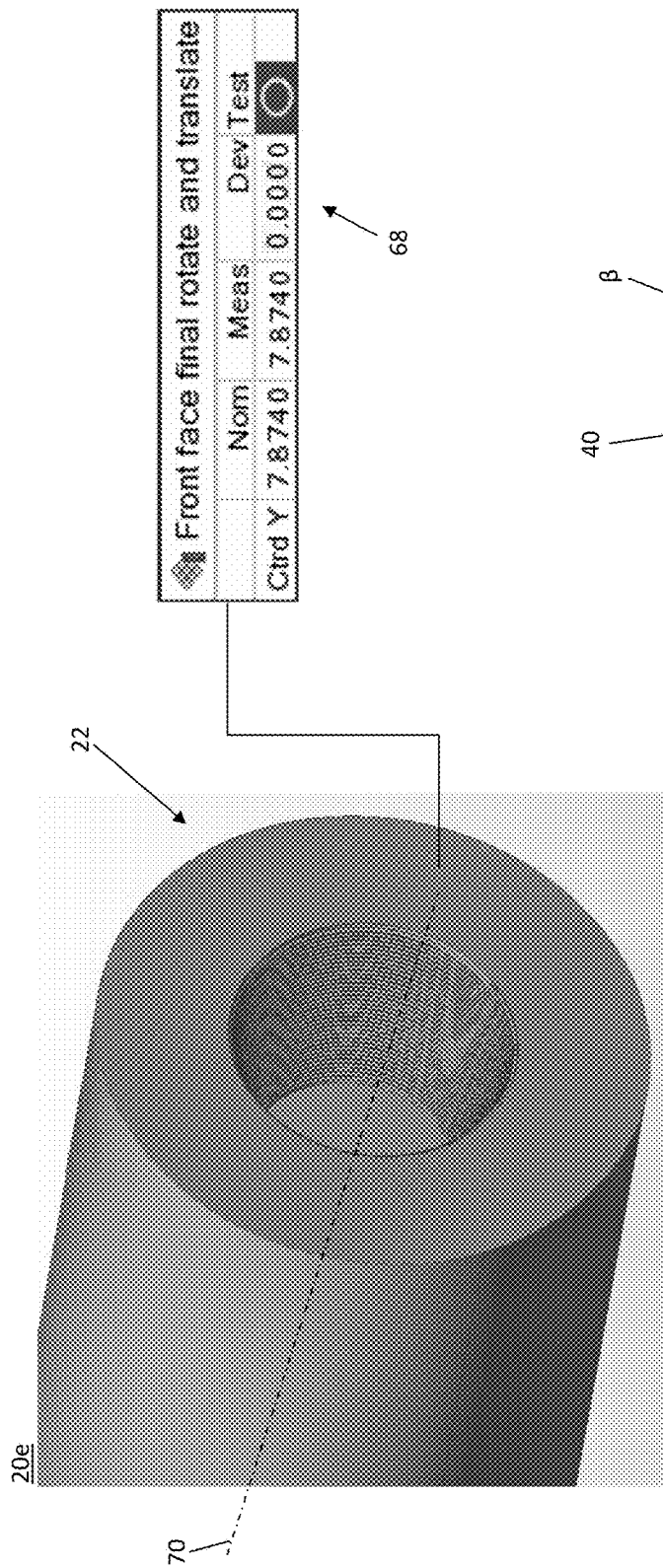

As a final check, the processing program can verify 28 the 3D model and optimized model are coaxially aligned at the center point 70 of their respective unthreaded front faces as the final translation and rotation relative to the Y-axis may result in a shift in the previously aligned Z-axis or X-axis. If it is determined that the center points of the respective faces are not aligned, the 3D model can be shifted back into alignment to produce the aligned 3D model as shown in FIG. 9E.

Once the 3D scan and optimized model have been aligned with a best fit 22 therebetween and the aligned 3D model has been produced, the machining tolerances 105 between the aligned 3D model and the optimized model can be evaluated 24 within the processing program and displayed. There are multiple features called out from the aligned 3D model when compared to the optimized model.

The machining tolerance data 72 is exported both numerically and from a colormap. The numerical measurements are posted out in a table form 26a as shown in FIG. 11 with each feature and the appropriate measurements that relate to that feature. The second output format is a colormap 26b as shown in FIGS. 12A and 12B. Although the colormap does not give as accurate of measured values, it provides a visual representation of how the machining looks that is not apparent to the naked eye. For example, categorized colors 72 allow end users to quickly determine if a product is within tolerance where the preferred embodiment indicates in tolerance measurements for the end users as "green" 72a, out of tolerance but likely acceptable for use on an EAF as "yellow" 72b, and out of tolerance and not acceptable for use on an EAF as "red" 72c. With very little training it is easy to see if the electrode is "within tolerance" or not.

To further expedite any of the steps carried out within the processing program, the method described herein also allows for the sorting 30 of the data which makes up the optimized model, the probe measurements, the scanned measurements and any other data processed within the processing program into smaller datasets. Subsequently, these processing steps can use these corresponding smaller datasets and ignore the other datasets to expedite the corresponding step. For example, if the data is sorted into individual geometric shapes, the data can be split up and only include data sections for processing for calculations where that data is pertinent to the output. Because the data points are correlated to a known XYZ position within the processing software prior to exporting the data, the data can be split up based off where it is within the XYZ position by bounding boxes to group similar data based off geometry.

A particular example of data sorting based off geometry is completed by first identifying the outside diameter of the electrode based on point cloud data having a radius larger than an identified value while a separate group of point cloud data is created with the points that are only near the outside diameter but which are not outside the identified value. Second, two planes can be created near the front face with only points between the two planes being categorized as part of the front face while another group of point cloud data can be created with points that are near the front face. Finally, two rough cones are drawn and points between the two cones can be filtered out and assumed to be part of the socket with another group of point cloud data being created with points that are only in the socket. With these distinct electrode features thereby defined by respective geometric regions, processing for each particular features can be expedited wherein data outside of the identified region can be ignored. Similarly, it will be appreciated that other data processing methodologies could incorporated into the present invention without departing from the inventive concepts described herein. Thus, the data sorting and processing step is not generally limited to section processing but could include processing of all measured point data without departing from the inventive method described herein Alternatively, simpler CAD models may be used to speed up processing time wherein smooth socket models can be as small as 1% the size of similar models with threads and similarly adjusted CAD models allows for even faster processing and better repeatability. Further still, historical scans can also be used to speed up processing time based off known scan features. For example, calculations are optimized when you know what the object looks like, you know its orientation and you can subsequently extract data from areas where you know that data exists such as sorted point cloud data for section processing.

The primary features evaluated for tolerance are directed to the threaded socket, the front face, and the outside diameter. Each of these features are measured by calculating the distance from the feature to the closest scanned point and the numerical values from these feature extractions are then used to calculate overall dimensions. These dimensions are then compared to the nominal data values and Graph Check can determine if the part is within tolerance or out of tolerance. However, there a numerous other element the improved measuring methodology described herein can measure and which therefore can be controlled to combat part failure, some of which being more applicable to graphite electrodes while others are generally applicable to all machined parts to which this measurement method is applied. These additional elements include but are not limited to the following:

- FIG. 13A: If pin is too large or the sockets are too small, the electrode faces will not come together, which causes electricity to run solely through the pin rather than the electrode.
- FIG. 13B: If the pin is too small or the socket is too large the pin will screw too far into the upper electrode and leave very little threaded engagement in the lower electrode.
- FIGS. 13C, 13D and 13E: Socket and pins include a taper for faster use and a stronger joint so the taper angle must also be controlled because it affects diameter and the resulting seating of the electrodes.
- FIGS. 13F, 13G and 13H: Locational concentricity between the socket and face axis can affect electrode alignment.
- FIGS. 13I and 13J: Thread form, such as convexity or concavity in the socket or pin, can affect thread engagement.
- FIG. 13K: A gap between the socket and pin threads is necessary for thermal expansion and therefore should be measured and controlled to assure tooth profiles provide correct engagement.
- FIGS. 13L and 13M: Face form, such as such out of tolerance concavity or convexity in the electrode face, can affect electrode flow. For example, faces of electrodes are slightly concave to assure electricity flows on outside surface of the electrode and to act as a Belleville washer for the locking joint and failures are more likely of the concavity is out of tolerance.

With further regard to electrodes, control parameters for the electrode length, socket and pin which can be measured and subsequently controlled according to the described system and method are more particularly listed in the chart below.

| Feature | Control | Description |
| --- | --- | --- |
| Outside Diameter | Diameter size | Ensures that the electrode diameter will fit within the furnace clamp |
| Outside Diameter | *Cylindricity | How close the outside diameter is to a perfect cylinder. |
| Socket | *Concentricity | How close is the socket to being on center to the outside diameter |
| Socket | *Perpendicularity | How perpendicular is the socket to the socket face |
| Socket | Taper Angle | This is the taper angle of the socket which needs to match the pins |

| Feature | Control | Description |
| --- | --- | --- |
| Socket | *Surface Profile | This is how "perfect" the threads in the socket are to an ideal model |
| Socket | Diameter | This determines how far the pin will fit inside of the electrode |
| Socket | Depth | This makes sure the pin will not bottom out when it is installed |
| Socket A/ Socket B | *Concentricity | This makes sure that both ends of the electrode line up to each other |
| Length | Length | This is how long the electrode is |
| Socket Face | *Flatness | This is a measurement of how flat the surface |
| Socket Face | *Surface finish | This is how rough the face of the electrode is |
| Socket face | *Perpendicularity | Ensures the electrode face is square to the outside diameter |
| Pin install | *Length | Is the pin installed to the correct depth |
| Upper cone to lower | *Concentricity | Measures position of the lower cone in relation to the upper cone |
| Thread profile | *Surface Profile | This is how "perfect" the threads of the pin are to an ideal model |
| Pin | Diameter | This determines how far the pin will fit inside of the electrode |
| Upper Cone | *Ovality | Measures how close the cone is to a perfect circle on a cross section |
| Lower Cone | *Ovality | Measures how close the cone is to a perfect circle on a cross section |
| Upper Cone | Taper Angle | This is the taper angle of the pin which needs to match the socket |
| Lower Cone | Taper Angle | This is the taper angle of the pin which needs to match the socket |
| Upper Cone | Height | This is the length of the upper cone |
| Lower Cone | Height | This is the length of the lower cone |
| Overall Height | Height | This is the length of the entire pin |

*Non-standard parameters

Notably, the parameters listed in the chart above expand on parameters which are defined in the international standard for electrode dimensions (IEC 60239) and by the National Electrical Manufacturers Association (NEMA CG-1-2013). Namely, the standard parameters include outside diameter of electrode, length of electrode, pitch diameter of socket, major diameter of pin, length of pin, depth of socket and length of thread (socket). Further, although the standard does define the absolute base requirements for what the dimensions should be, they fail to define how each feature needs to be aligned to the other features so the system described herein not only checks each of the standard parameters but further verifies the electrodes align correctly and are not susceptible to failure even when they may be in tolerance of accepted standards.

As noted herein, the inventive measurement technique is generally applicable to machined parts having a threaded section but was particularly developed for use with graphite electrodes beyond mere tolerance assurance. In particular, implementation of the method described herein allows the shape of each electrode and pin to be measured, recorded and monitored for performance. For example, some furnaces burn hotter, some have more mechanically stressful environments, and some are barely able to stress the electrode. Furnace operation can directly impact electrode performance if the dimensions of the electrode are not customized for each furnace. The electrodes are typically made with generic "safe" tolerances, which still work, but will not perform as well as a perfectly optimized electrode for a particular furnace. Based on the measured data and known EAF characteristics, the Graph Check system will be able to warn the EAF operators if the machining of the electrode is so far off that it may cause the electrode to break in a particular furnace but be optimized for another furnace.

As explained above, electrode breaks are very detrimental to the customer's productivity, and they pose a safety risk during removal of the broken electrode from the furnace. Thus, the Graph Check system is not only an improved measurement method for electrode manufacturers but is also a tool for customers in the industry to be able to keep their suppliers trustworthy and honest. The system and methodology described herein is therefore simple enough to allow for the customer to be able to measure their own electrodes while being robust enough to offer significantly more information that the easy-to-use ring-gauge and H-gauge methodologies. Furthermore, the combination of the CMM probe and the laser scanner prevents the operator from influencing the measurements from time to time because the laser scans are able to repeatably measure with any operator.

The majority of melt shops do not have the ability to measure the electrodes before they go onto the furnace. Most of the suppliers know this and they are able to ship out bad product without the customer knowing because it was "good enough". If the steel mills have access to measure the electrodes, they will be able to make sure that they are getting what they are paying for. Each furnace is run a little bit differently, and a customized electrode tolerance for each furnace would be able to increase the performance of the electrodes. If the furnace is running hotter than standard, then the socket may need to be machined a bit larger to allow for additional thermal expansion. If the furnace is running very mechanically violently, the joint dimensions may need to be adjusted to make a stronger joint to fight against the additional stress.

In another aspect of the invention described herein, automatic machine learning could be used to calculate the perfect dimensions for a specific furnace. Predicting performance based on machine learning allows for more optimized mating of electrode to furnace. All furnaces run a bit differently, yet all electrodes are machined to the same tolerances. Some furnaces have more mechanical stresses, while others have greater electrical stresses, but with less physical forces on the electrode. Many steel mills are starting to monitor performance of the electrodes. Thus, by adding in additional tolerance data, the steel mill can start to determine if the electrode works better when the socket and/or pin is sized differently than standard. The machining dimensions for each electrode could then be correlated with that specific electrode's consumption data and by varying the machining dimensions slightly up and down, the machine learning algorithm could slowly "tune" the dimensions to be perfect for that furnace.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the current methodology includes the use of mobile or stationary CMM probes and laser scanning devices which may be attached to the head of the same measuring arm or kept separate from one another with different arms, it will be appreciated that an alternative embodiment may combine the CMM probe with the laser scanner to measure product geometry at the same time in combination with a solid model to check product geometry, which is not obvious to those trained in the art. Thus, the breadth and scope of the present invention should not be limited by any of the above-described exemplary embodiments, but should be defined only in accordance with the following claims appended hereto and their equivalents.

What is claimed is:

1. A method for determining a machining tolerance of a machined electrode having a threaded section and an unthreaded section, comprising the steps of:
    collecting a set of probe measurements of the unthreaded section of the machined electrode and the threaded section of the machined electrode via a coordinate measuring machine;
    collecting a set of scanned measurements of the unthreaded section of the machined electrode and the threaded section of the machined electrode via a three-dimensional laser scanner;
    receiving in a processing program running on a computer processor an optimized model of the machined electrode having a reference feature, the set of probe measurements and the set of scanned measurements;
    roughly aligning within the processing program the set of probe measurements with the optimized model without clocking the threaded section of the machined electrode relative to the reference feature; and
    precisely aligning within the processing program the set of scanned measurements with the optimized model by clocking the threaded section of the machined electrode relative to the reference feature.

2. The method of claim 1 further comprising the steps of:
    determining within the processing program a best fit between the set of scanned measurements and the optimized model while clocking the threaded section of the machined electrode relative to the reference feature, wherein the best fit comprises an aligned 3D model of the machined electrode; and
    determining within the processing program the machining tolerance between the aligned 3D model and the optimized model.

3. The method of claim 2, wherein the threaded section comprises a set of tapered threads having a crest, a root, a flank, a thread pitch and a thread angle, and wherein the reference feature comprises a two-dimensional dataset having a reference pitch and a reference angle generally corresponding with the thread pitch and the thread angle.

4. The method of claim 3, wherein the step of determining the best fit while clocking the threaded section of the machined electrode relative to the reference feature further comprises the steps of:
    identifying a group of measurements in the set of scanned measurements which correspond to a portion of the threaded section that are within a threshold distance of the reference feature;
    translating the set of scanned measurements relative to the reference feature until at least some of the group of measurements intersect with the reference feature;
    determining a deviation between the set of scanned measurements and the optimized model at the unthreaded section; and
    translating and rotating the set of scanned measurements by a movement factor corresponding to the deviation until the deviation is within a threshold value to get the aligned 3D model of the machined electrode.

5. The method of claim 4, further comprising the step of verifying that of the set of scanned measurements at a center point of the unthreaded section is coaxial with a corresponding center point of the unthreaded section of the optimized model.

6. The method of claim 4, wherein at least a portion of the two-dimensional dataset of the reference pitch and the reference angle are embedded in a three-dimensional portion of at least one of the tapered threads, wherein the movement factor comprises a translation parameter and a rotation parameter respectively corresponding to the translation and the rotation of the set of scanned measurements by the movement factor, wherein the translation parameter is equal to the deviation, and wherein the rotation parameter is equal to the deviation divided by the thread pitch multiplied by three hundred and sixty degrees.

7. The method of claim 3, wherein the step of collecting the set of probe measurements further comprises the steps of:
    collecting the set of probe measurements of the threaded section by placing a probe of the coordinate measuring machine onto a plurality of locations of the threaded section at an interior surface of the machined electrode, wherein each of the plurality of locations are spaced substantially equidistant between the flanks of adjacent threads at a first distance away from the root of adjacent threads; and
    collecting the set of probe measurements of the unthreaded section by placing the probe of the coordinate measuring machine onto a plurality of locations of the unthreaded section at an exterior surface of the machined electrode, wherein a first set of locations from the plurality of locations are positioned on a front plane of the machined electrode, and wherein a second set of locations from the plurality of locations are positioned around an outer diameter of the machined electrode.

8. The method of claim 1, wherein the coordinate measuring machine and the three-dimensional laser scanner have a standard calibration with the processing program.

9. The method of claim 2, further comprising the step of displaying the machining tolerance on a user interface with at least one of a color map visually outlining the variance between the aligned 3D model and the optimized model and a numerical table statistically outlining the variance between the aligned 3D model and the optimized model.

10. The method of claim 1, further comprising the step of sorting the optimized model, the set of probe measurements and the set of scanned measurements into a plurality of smaller datasets within the processing program, wherein each of the steps carried out within the processing program further comprise the step of processing with a corresponding smaller dataset.

11. The method of claim 1, wherein the set of scanned measurements is at least five orders of magnitude larger than the set of probe measurements.

12. A method for determining a machining tolerance of a machined part having a threaded section and an unthreaded section, comprising the steps of:

- collecting a set of probe measurements of the unthreaded section of the machined part and the threaded section of the machined part via a coordinate measuring machine;
- collecting a set of scanned measurements of the unthreaded section of the machined part and the threaded section of the machined part via a three-dimensional laser scanner;
- receiving in a processing program running on a computer processor an optimized model of the machined part, a reference feature corresponding with the threaded section, the set of probe measurements and the set of scanned measurements;
- roughly aligning the set of probe measurements with the optimized model within the processing program without clocking the threaded section of the machined part relative to the reference feature; and
- precisely aligning the set of scanned measurements with the optimized model within the processing program by clocking the threaded section of the machined part relative to the reference feature to get a best fit therebetween, wherein the best fit comprises an aligned 3D model of the machined part;
- determining with the processing program the machining tolerance between the aligned 3D model and the optimized model.

13. The method of claim 12, wherein threaded section comprises a set of tapered threads having a crest, a root, a flank, a thread pitch and a thread angle, and wherein the reference feature comprises a two-dimensional dataset having a reference pitch and a reference angle generally corresponding with the thread pitch and the thread angle in the optimized model.

14. The method of claim 13, wherein the step of determining the best fit while clocking the threaded section of the machined part relative to the reference feature further comprises the steps of:

- identifying a group of measurements in the set of scanned measurements which correspond to a portion of the threaded section that are within a threshold distance of the reference feature;
- translating the set of scanned measurements relative to the reference feature until at least some of the group of measurements intersect with the reference feature;
- determining a deviation between the set of scanned measurements and the optimized model at the unthreaded section; and
- translating and rotating the set of scanned measurements by a movement factor corresponding to the deviation until the deviation is within a threshold value to get the aligned 3D model of the machined part.

15. The method of claim 12, wherein the step of collecting the set of probe measurements further comprises the steps of:

- collecting the set of probe measurements of the threaded section by placing a probe of the coordinate measuring machine onto a plurality of locations of the threaded section at an interior surface of the machined part, wherein each of the plurality of locations are spaced substantially equidistant between the flanks of adjacent threads at a first distance away from the root of adjacent threads; and
- collecting the set of probe measurements of the unthreaded section by placing the probe of the coordinate measuring machine onto a plurality of locations of the unthreaded section at an exterior surface of the machined part, wherein a first set of locations from the plurality of locations are positioned on a front plane of the machined part, and wherein a second set of locations from the plurality of locations are positioned around an outer diameter of the machined part.

16. A method for determining a machining tolerance of a machined part having a threaded section and an unthreaded section, comprising the steps of:

- collecting a set of probe measurements of the threaded section by placing a probe of a coordinate measuring machine onto a plurality of locations of the threaded section at an interior surface of the machined part, wherein the threaded section comprises a set of tapered threads having a crest, a root, a flank, and wherein each of the plurality of locations are spaced substantially equidistant between the flank of adjacent threads at a first distance away from the root of adjacent threads;
- collecting another set of probe measurements of the unthreaded section by placing the probe of the coordinate measuring machine onto a plurality of locations of the unthreaded section at an exterior surface of the machined part;
- collecting a set of scanned measurements of the unthreaded section of the machined part and the threaded section of the machined part via a three-dimensional laser scanner;
- receiving in a processing program running on a computer processor an optimized model of the machined part, a reference feature corresponding with the threaded section, the set of probe measurements and the set of scanned measurements;
- determining within the processing program a relative position of the unthreaded part and the threaded part using the first set of measurements;
- roughly aligning the set of probe measurements with the optimized model within the processing program without clocking the threaded section of the machined part relative to the reference feature; and
- precisely aligning the set of scanned measurements with the optimized model within the processing program by clocking the threaded section of the machined part relative to the reference feature to get a best fit therebetween, wherein the best fit comprises an aligned 3D model of the machined part;
- determining with the processing program the machining tolerance between the aligned 3D model and the optimized model.

17. The method of claim 16, wherein threaded section further comprises a thread pitch and a thread angle, and wherein the reference feature comprises a two-dimensional dataset having a reference pitch and a reference angle generally corresponding with the thread pitch and the thread angle in the optimized model.

18. The method of claim 17, wherein the step of determining the best fit while clocking the threaded section of the machined part relative to the reference feature further comprises the steps of:

- identifying a group of measurements in the set of scanned measurements which correspond to a portion of the threaded section that are within a threshold distance of the reference feature;
- translating the set of scanned measurements relative to the reference feature until at least some of the group of measurements intersect with the reference feature;

determining a deviation between the set of scanned measurements and the optimized model at the unthreaded section; and translating and rotating the set of scanned measurements by a movement factor corresponding to the deviation until the deviation is within a threshold value to get the aligned 3D model of the machined part.

19. The method of claim 16, further comprising the step of displaying the machining tolerance on a user interface with at least one of a color map visually outlining the variance between the aligned 3D model and the optimized model and a numerical table statistically outlining the variance between the aligned 3D model and the optimized model.

20. The method of claim 16, wherein the set of scanned measurements is at least five orders of magnitude larger than the set of probe measurements.

* * * * *